US010979301B2

(12) United States Patent
Mantri

(10) Patent No.: US 10,979,301 B2
(45) Date of Patent: Apr. 13, 2021

(54) SYSTEMS AND METHODS FOR SEARCHING FILES ACROSS DISTRIBUTED WLAN-CONNECTED DEVICES

(71) Applicant: Verizon Patent and Licensing Inc., Arlington, VA (US)

(72) Inventor: Viraj C. Mantri, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/529,336

(22) Filed: Aug. 1, 2019

(65) Prior Publication Data

US 2021/0036927 A1   Feb. 4, 2021

(51) Int. Cl.
*H04L 12/24*   (2006.01)
*H04W 84/12*   (2009.01)

(52) U.S. Cl.
CPC ............ *H04L 41/12* (2013.01); *H04W 84/12* (2013.01)

(58) Field of Classification Search
CPC ......... H04L 67/04; H04L 67/06; H04L 67/16; H04L 67/104; H04L 67/141; H04L 41/12; H04W 8/005; H04W 76/38
USPC ............. 370/312, 328, 329, 331; 455/414.1; 709/223
See application file for complete search history.

(56) References Cited

U.S. PATENT DOCUMENTS

| | | | | |
|---|---|---|---|---|
| 2007/0281667 A1* | 12/2007 | Minor | ................... | H04L 67/104 455/414.1 |
| 2012/0101942 A1* | 4/2012 | Park | ...................... | G07B 15/02 705/40 |
| 2012/0317262 A1* | 12/2012 | Kim | ........................ | H04L 67/16 709/223 |
| 2017/0085698 A1* | 3/2017 | Lee | ........................ | H04W 8/005 |
| 2019/0141165 A1* | 5/2019 | Yamada | ................ | H04L 67/141 |

* cited by examiner

*Primary Examiner* — Harun Chowdhury

(57) ABSTRACT

A network router maintains a list of devices that are connected to a network established by the network router, where the list includes a first device and at least one other device and where the at least one other device includes a wired or a wireless device. The network router receives, from the first device, a search request that includes search terms for performing a file search, and broadcasts, to the at least one other device, the search request that includes the search terms. The network router receives search responses from the at least one other device, where each of the search responses comprises a device identifier associated with a responding one of the at least one other device and a file name and file location information of at least one file that matches the search terms. The network device forwards the search responses to the first device.

20 Claims, 15 Drawing Sheets

SYSTEMS AND METHODS FOR SEARCHING FILES ACROSS DISTRIBUTED WLAN-CONNECTED DEVICES

BACKGROUND

Various different devices may be used by a network customer (i.e., a user) to connect to a network operated by a service provider. In some circumstances, a user may use multiple devices to connect to the network via a network access device, such as a modem or a router, which may be owned by the network service provider. For example, a wireless network router may be installed at a user's premises, and the user may access the service provider's network via the wireless network router using multiple wireless devices (e.g., laptop, phone, gaming console, tablet, smart speaker, etc.). When the wireless router establishes a local wireless network, different wireless devices can connect to the established local wireless network and access the service provider's network. The wireless network router routes traffic between the service provider's network and the different wireless devices via the local wireless network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

File searching in a network environment is a common activity, where a user can access a network directory on a centralized server, via a connected network, to locate a file stored on the centralized server. Existing file searching systems, however, do not permit the decentralization of search capabilities, where every network-connected device becomes a search proxy to perform file searches, and to transfer search results, over a connected network to a search-originating device. In embodiments described herein, a search application may be deployed, from a network router, to each device that is connected to the router (e.g., via a wireless network or wired connection). The search application installed at each router-connected device may subsequently, based on user input, generate queries for searching files at other wireless network-connected devices, where the network router facilitates performing the searches, obtaining search results, and transferring files among the router-connected devices. Each router-connected device, therefore, serves as an independent search station for searching locally stored files, on behalf of another search originating router-connected device, and for returning search results generated by the search of the local files to the search-originating router-connected device. In one implementation, one or more device connected to the network router may connect via a wireless network established by the network router. The wireless network may include a wireless local area network, such as a Wi-Fi network, and the network router may include a wireless network router, such as a Wi-Fi router. The network router serves as an intermediary/facilitator for file searches, and for transfers of files identified in the search results, between devices connected to the network router.

Figure 1A:
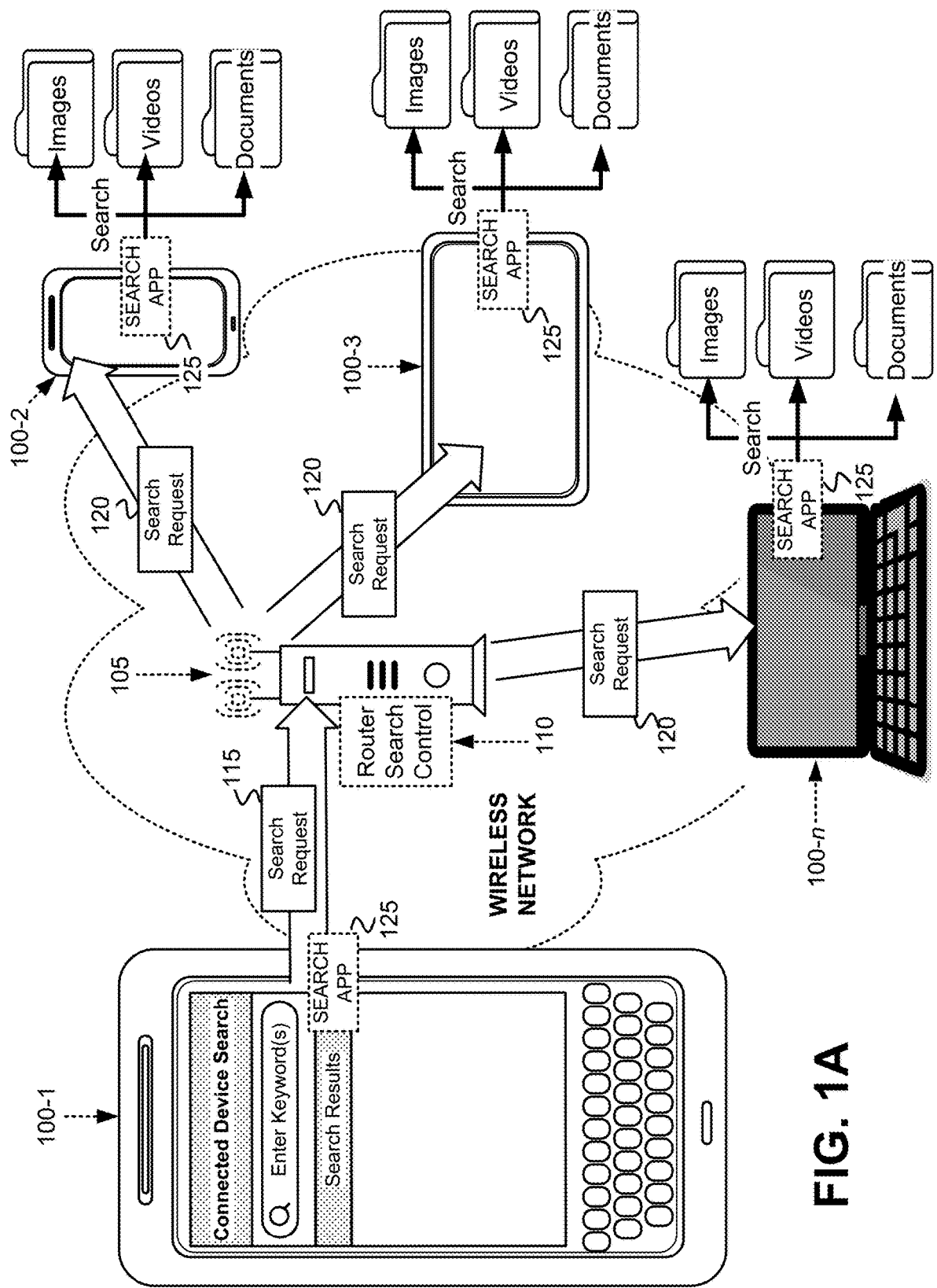
FIGS. 1A and 1B depict an overview of file searching performed between router-connected devices.
Figure 1B:
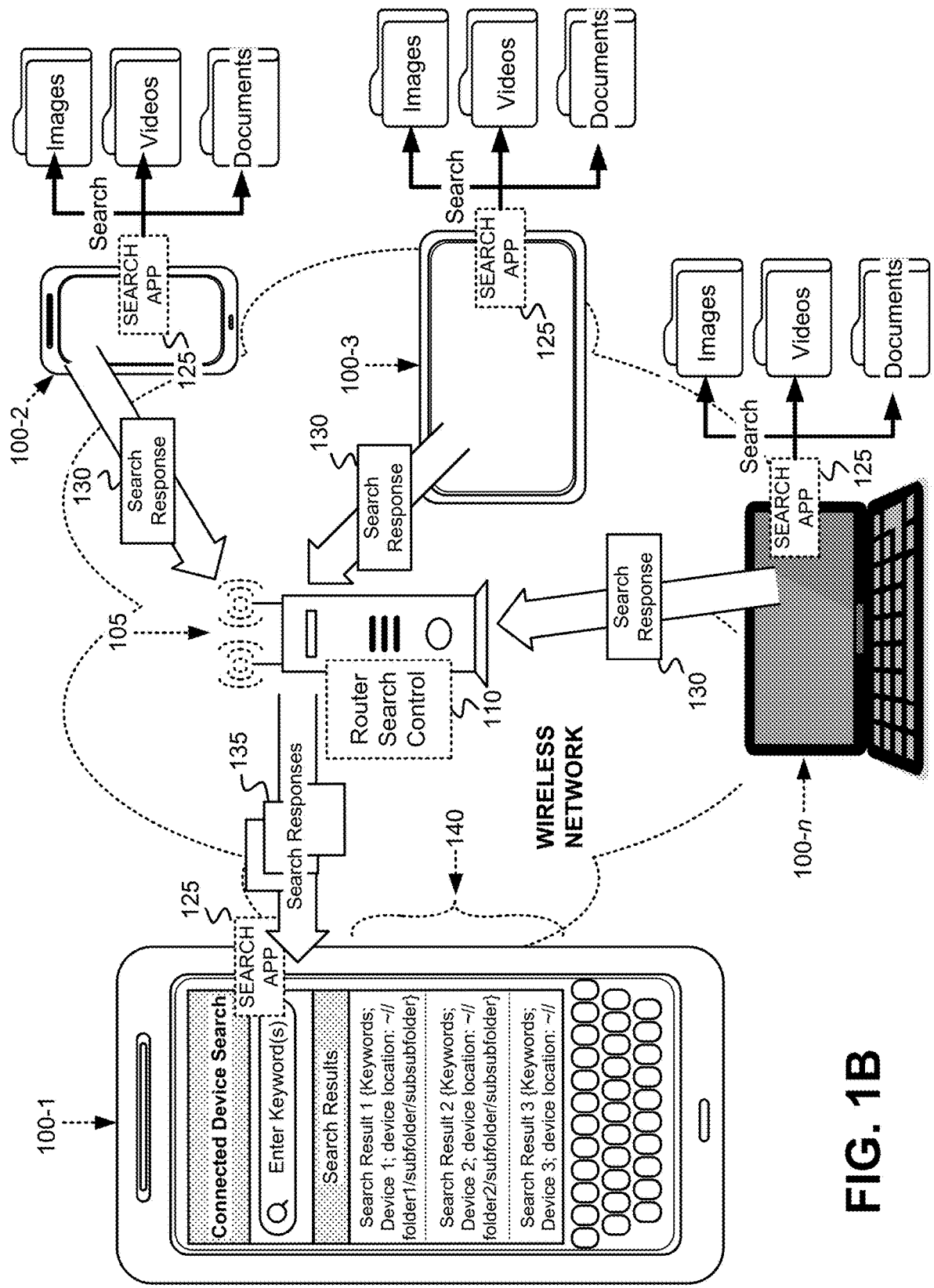

FIGS. 1A and 1B depict an overview of file searching performed between router-connected devices. Referring to FIG. 1A, wireless devices 100-1 through 100-n (where n is any positive integer greater than or equal to two) may connect to a wireless network router 105 in an ad-hoc fashion. Wireless devices 100-1 through 100-n (referred to herein as "wireless devices 100," "wireless device 100," "device 100," or "devices 100") may include any type of electronic device having a wireless network communication capability and some form of user interface that enables a user of the device 100 to enter search terms associated with file searches. Each of the wireless devices 100 may include a laptop, palmtop, desktop, or tablet computer; a personal digital assistant (PDA); a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; or a set-top box (STB). In other implementations, devices 100 may include any type of electronic device having wired and/or wireless network communication capability and some form of user interface that enables a user of the device 100 to enter search terms associated with file searches.

Wireless network router 105 (referred to herein as a "wireless network router," "wireless router device," "wireless router," "router device," or "network router") may include functionality capable of establishing a wireless network to which each of the wireless devices 100 may authenticate and connect. Additionally, router 105 may include one or more ports to which a wired device 100 may connect, or to which a wired network (e.g., wired LAN) may connect. In some implementations, the wireless network may include a wireless local area network (WLAN), and wireless router 105 may include a WLAN router. In one particular implementation, wireless router 105 may include a Wi-Fi network router (e.g., a router that establishes a Wi-Fi network based on the IEEE 802.11 family of standards). Wireless devices 100, thus, may wirelessly connect to router 105 (e.g., via WLAN connections). Wireless router 105 may additionally connect to another network (not shown in FIGS. 1A and 1B) such as a cable network, an optical fiber network, a mobile network (e.g., a Public Land Mobile Network (PLMN) or satellite network), a Public Switched Telephone Network (PSTN), or other type of network and serve as a routing device for routing data traffic between the wireless network and the other network. In one implementation, wireless router 105 may include a Wi-Fi customer premises router that is installed at a customer's residential or commercial premises and connected to a service provider's network (e.g., connected to Verizon's Fiber Optic Service (Fios) network). In other implementations, network router 105 may include functionality capable of establishing a wired network to which one or more of the devices 100 may connect. In some implementations, the wired network may include a local area network (LAN), and network router 105 may include a LAN router. Wired devices 100, thus, may connect to router 105 via wired connections (e.g., via wired LAN connections or a network router LAN port). Network router 105 may, in some implementations, interconnect one or more wireless and/or wired devices 100 to another network. For example, network router 105 may interconnect one or more wireless devices 100 and/or one or more wired devices 100 to another network (e.g., to the Internet).

Authentication of each wireless device 100 during router connection may, for example, include providing a network password. As each device 100 authenticates and connects to router 105 (e.g., to the wireless network established by the router 105), router 105 maintains a list that identifies each of the currently authenticated and router-connected devices 100. Router 105 may further include, implemented in software, firmware, and/or hardware, a router search controller 110 (referred to herein as "router search control 110"). Router search control 110 acts as a facilitator for processing, storing, and forwarding search requests and search results between router-connected devices 100, such as between WLAN-connected wireless devices. Router search control 110 may additionally act as an intermediary for transferring search result files between devices 100.

Subsequent to a device 110-1's connection to router 105, a user (not shown) of device 100-1 may execute a search application 125 at the device 100-1 to perform a search of files of other router-connected devices (e.g., devices 100-2, 100-3, and 100-*n*). The user enters search terms into the search application 125 at device 100-1 to search for particular files at router-connected devices 100-2 through 100-*n*. The search terms may include, for example, keywords directed to the subject matter of the file search. Additionally, the search terms may include search operators that may be associated with the one or more of the keywords. The search operators may include simple Boolean operators (e.g., AND, OR, NOT), and/or may include more advanced search operators. Device 100-1 generates, based on the user-entered search terms, a search request 115 and sends the search request 115 to the router 105.

Upon receipt of the search request 115 from device 100-1, router search control 110 broadcasts the original search request 115 to the router-connected devices 100-2, 100-3, 100-*n* as a broadcasted search request 120. A search application 125 at each device 100-2, 100-3, and 100-*n*, upon receipt of the search request 120, extracts the search terms from the request 120 and performs a search of files locally stored at the respective device 100 based on the search terms (e.g., a search app 125 at device 100-2 searches locally stored files in a memory of device 100-2, a search app 125 at device 100-3 searches locally stored files in a memory of device 100-3, etc.). The stored files may include, for example, image files, video files, and/or document files (e.g., word processing files, such as Microsoft™ Word files) that may be stored in one or more folders and/or subfolders of each device 100. The files may, however, include any other type of file. The search app 125 at each device 100-2, 100-3, and 100-*n* generates a set of search results from the local search using the search terms. The set of search results at each of devices 100-2, 100-3, and 100-*n* may include a file name and file location of each search term matching file that is stored locally at the device 100. The search performed by search app 125 may, for example, search the locally stored files to identify a subset of the files whose file names and/or metadata match the search terms.

Referring to FIG. 1B, devices 100-2, 100-3, and 100-*n* each generate a respective search response 130 that includes the name and location of each file stored locally at the device 100 that matches the search terms from the search request from device 100-1. Each search response 130 additionally includes a device ID that identifies the device 100 from which the search results were sent. Upon receipt of the search responses 130, router search control 110 of the router 105 may generate a response message 135 that includes the multiple search responses from devices 100-2, 100-3, and 100-*n*. Router search control 110 forwards the response message 135, with the search responses, to the search originating device 100-1. Device 100-1, subsequent to receipt of the search responses from devices 100-2, 100-2, and 100-*n*, presents the search results 140 via, for example, a display of the device 100-1. In one implementation, the display of the device 100-1 may include a touch screen display.

Figure 2:
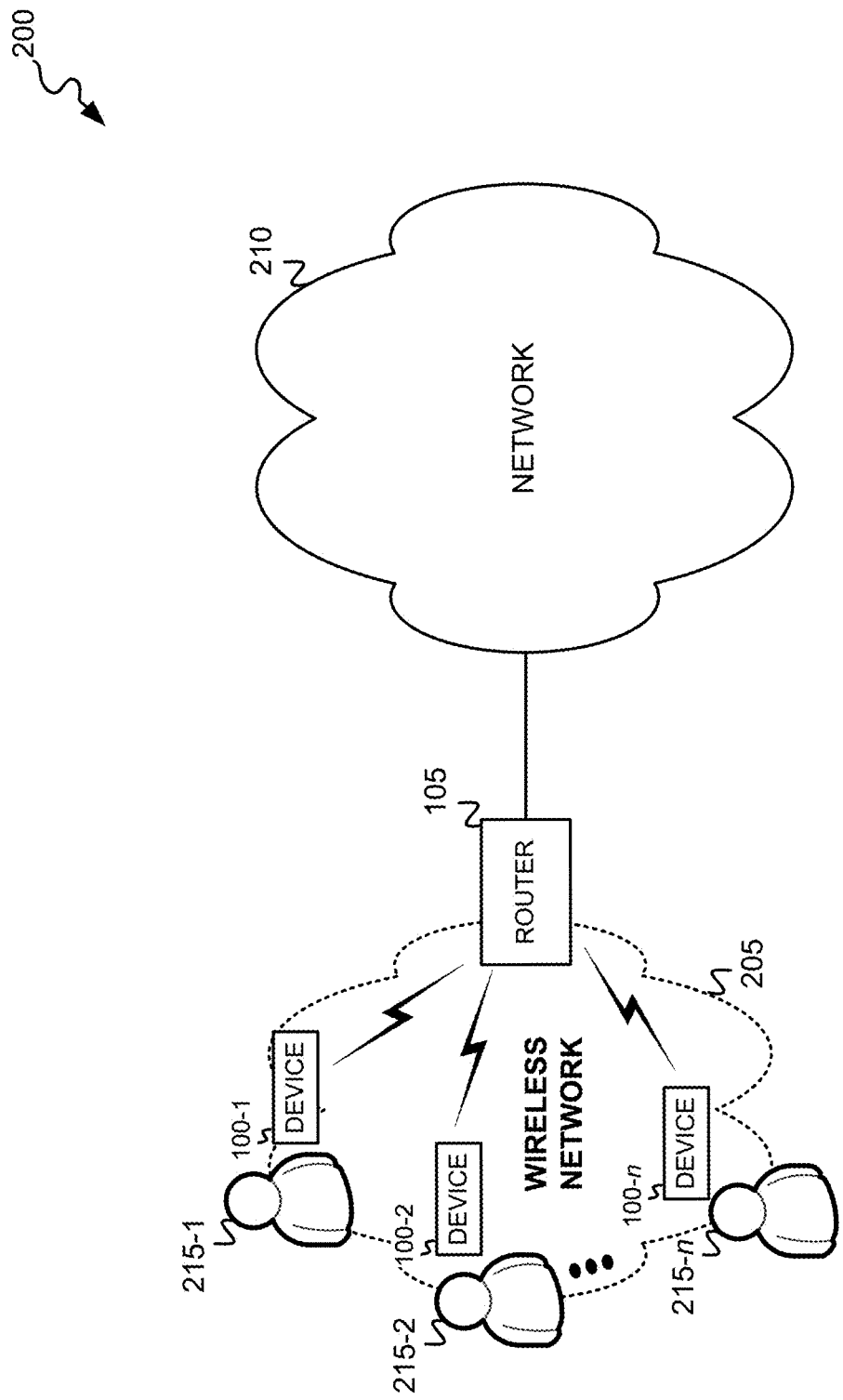
FIG. 2 illustrates an exemplary network environment in which file searching may be conducted between router-connected devices.

FIG. 2 illustrates an exemplary network environment 200 in which file searching may be conducted between router-connected devices. As shown, devices 100-1 through 100-*n* may connect to a network router 105, either via a wireless network 205, via a direct wired connection to router 105, or via a wired network (e.g., wired LAN) connection to router 105. Network router 105 may further connect, via a wired or wireless connection, to another network 210. Network 210 may be operated by a service provider (e.g., Verizon's Fios network), and may be a wired or wireless network. Network 210 may include, for example, a Public Switched Telephone Network (PSTN), a fiber optic cable network, or a mobile network (e.g., a satellite or Public Land Mobile Network (PLMN)). Network 210 may also include other types of networks. Network 210 may interconnect with another network (not shown) via, for example, a gateway, such that devices 100 connected to wireless network 205 may send and/or receive data across network 210 to/from destination devices in the other network. The other network may, in some implementations, include the Internet. A respective user 215 may carry, use, administer, and/or operate each wireless device 100. As shown in FIG. 2, a user 215-1 may use device 100-1, a user 215-2 may use device 100-2, and a user 215-*n* may use device 100-*n*.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2.

Figure 3:
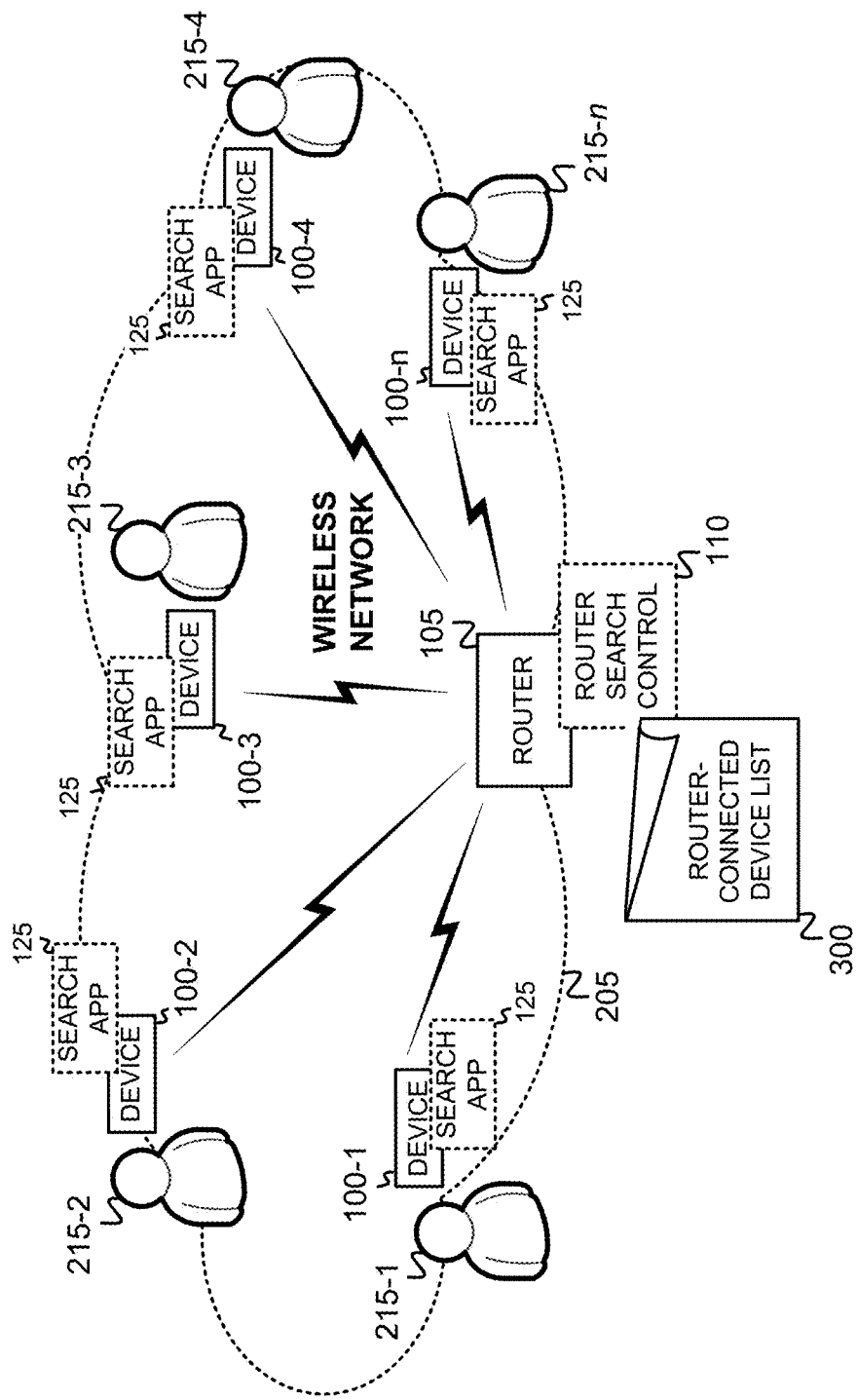
FIG. 3 depicts details of devices connecting to a network router for conducting file searching between the router-connected devices.

FIG. 3 depicts further details of devices 100 connecting to network router 105 for file searching between the wireless network-connected devices 100. As shown, network router 105 establishes and maintains wireless network 205 (e.g., a Wi-Fi network) such that each wireless device 100 may wirelessly connect to wireless router 105 via the wireless network 205. Upon connecting to wireless network router 105, router search control 110 at wireless router 105 may deploy a search application (app) 125 at each newly connected device 100. Search app 125 can subsequently be used for generating search queries for searching files stored locally at other router devices 100, and also for performing searches of locally stored files based on search queries received from other network-connected devices 100. As each wireless device 100 connects to wireless network 205, router search control 110 at wireless router 105 adds the wireless device 100 to a list 300 (referred to herein as "router-connected device list 300") that stores a list of devices 100 that are currently connected to router 105 (e.g., via wireless network 205, via a wired connection to router 105, or via a wired network (e.g., wired LAN) connection to router 105). As described further below, router-connected device list 300 may be used by router search control 110 for identifying currently connected devices 100 to which router 105 may broadcast a search request from a search-originating wireless device 100.

Figure 4:
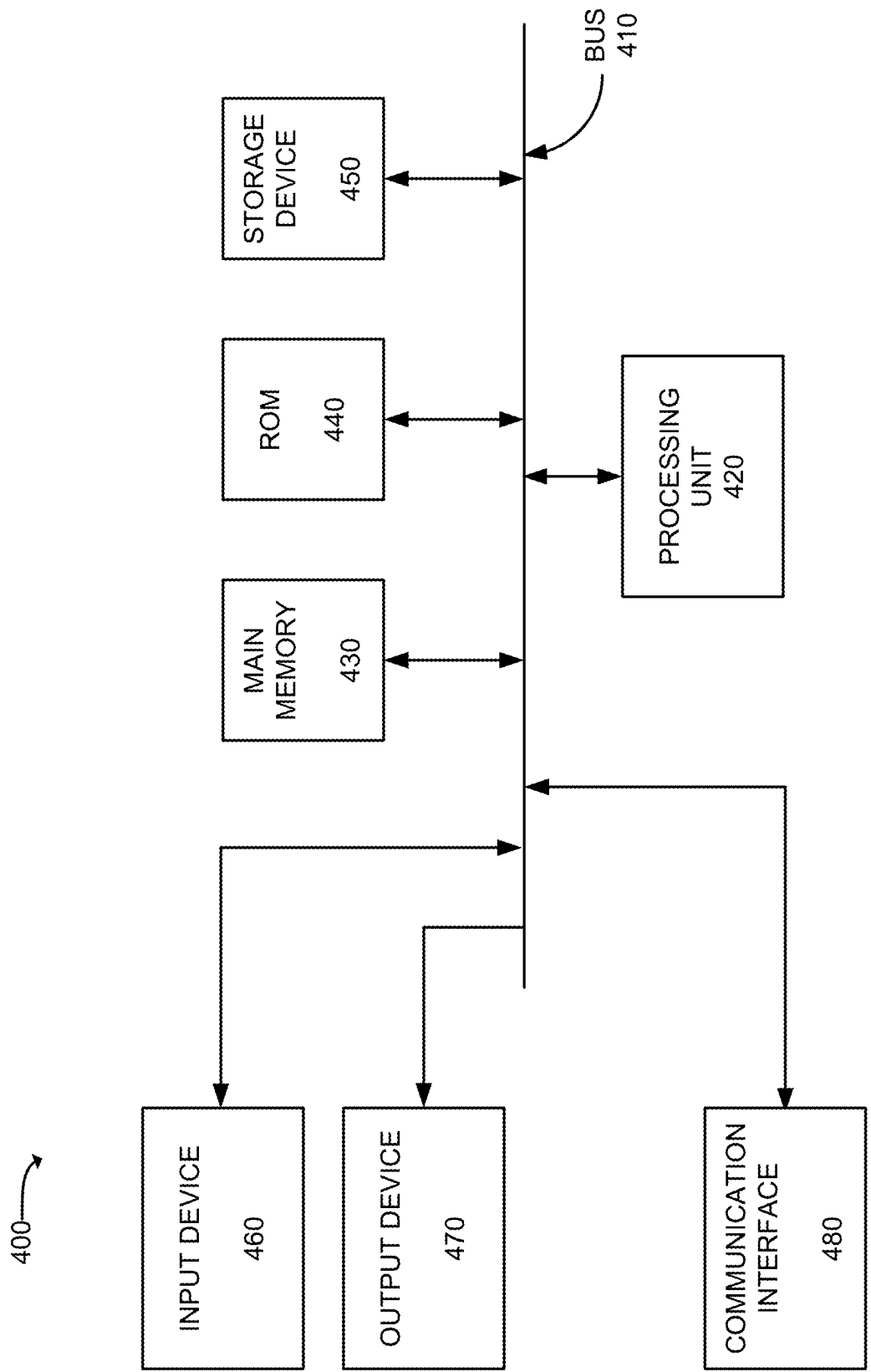
FIG. 4 is a diagram that depicts exemplary components of a device that may correspond to the network router and/or devices of FIG. 2.

FIG. 4 is a diagram that depicts exemplary components of a device 400. Router 105 and/or devices 100 may each include similar components to the device 400, and may be arranged in a similar configuration as the device 400. Device 400 may include a bus 410, a processing unit 420, a main memory 430, a read only memory (ROM) 440, a storage device 450, an input device 460, an output device 470, and a communication interface 480. Bus 410 may include a path that permits communication among the other components of device 400.

Processing unit 420 may include one or more processors or microprocessors which may interpret and execute stored instructions associated with one or more processes, or processing logic that implements the one or more processes. For example, processing unit 420 may include, but is not limited to, programmable logic such as Field Programmable Gate Arrays (FPGAs) or accelerators. Processing unit 420 may include software, hardware, or a combination of software and hardware for executing the processes described herein.

Main memory 430 may include a random access memory (RAM) or another type of dynamic storage device that may store information and, in some implementations, instructions for execution by processing unit 420. ROM 440 may include a ROM device or another type of static storage device (e.g., Electrically Erasable Programmable ROM (EEPROM)) that may store static information and, in some implementations, instructions for use by processing unit 420. Storage device 450 may include a magnetic, optical, and/or solid state (e.g., flash drive) recording medium and its corresponding drive. Main memory 430, ROM 440 and storage device 450 may each be referred to herein as a "non-transitory computer-readable medium" or a "non-transitory storage medium." The processes/methods set forth herein can be implemented as instructions that are stored in main memory 430, ROM 440 and/or storage device 450 for execution by processing unit 420.

Input device 460 may include one or more devices that permit an operator to input information to device 400, such as, for example, a keypad or a keyboard, a display with a touch sensitive panel, voice recognition and/or biometric mechanisms, etc. Output device 470 may include one or more devices that output information to the operator, including a display, a speaker, etc. Input device 460 and output device 470 may, in some implementations, be implemented as a user interface (UI), such as a touch screen display, that displays UI information and which receives user input via the UI. Communication interface 480 may include one or more transceivers that enable device 400 to communicate with other devices and/or systems. For example, communication interface 480 may include a wireless transceiver for communicating via wireless network 205. As another example, communication interface 480 may include a wired transceiver for communicating with router 105 via a wired connection.

Device 400 may perform certain operations or processes, as may be described herein. Device 400 may perform these operations in response to processing unit 420 executing software instructions contained in a computer-readable medium, such as memory 430. A computer-readable medium may be defined as a physical or logical memory device. A logical memory device may include memory space within a single physical memory device or spread across multiple physical memory devices. The software instructions may be read into main memory 430 from another computer-readable medium, such as storage device 450, or from another device via communication interface 480. The software instructions contained in main memory 430 may cause processing unit 420 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 400 illustrated in FIG. 4 is for illustrative purposes only. Other configurations may be implemented. Therefore, device 400 may include additional, fewer and/or different components, arranged in a different configuration, than depicted in FIG. 4.

Figure 5A:
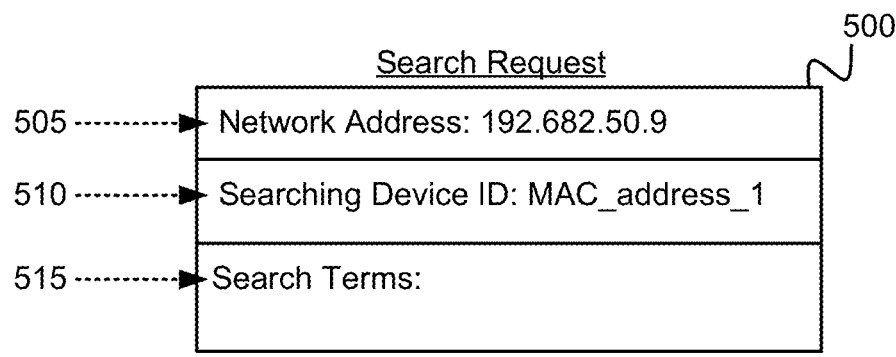
FIG. 5A illustrates an exemplary search request message that may be used for sending search requests from a router connected device to other router-connected devices via an intermediary network router.

FIG. 5A illustrates an exemplary search request message 500 (referred to herein as "Search Request 500") that may be used for sending file search requests from a router-connected device 100 to other router-connected devices 100 via an intermediary network router 105. Search request 500 may include a network address field 505, a searching device identifier (ID) field 510, and a search terms field 515. Search request 500 may include additional fields that are not shown in FIG. 5A for purposes of simplicity.

Network address field 505 stores a network address (e.g., an Internet Protocol (IP) address) associated with the router 105 (e.g., wireless network 205 established by router 105) to which devices 100 are connected that the search request 500 is targeting for file searching. Searching device identifier (ID) field 510 stores a unique device identifier (e.g., a Medium Access Control (MAC) address) of the device 100 that originates the search request 500. Search terms field 515 stores one or more keywords that are to be searched at the router-connected wireless devices 100. In some implementations, search terms field 515 may additionally store one or more search operators (e.g., Boolean search operators) that are associated with one or more of the keywords.

Figure 5B:
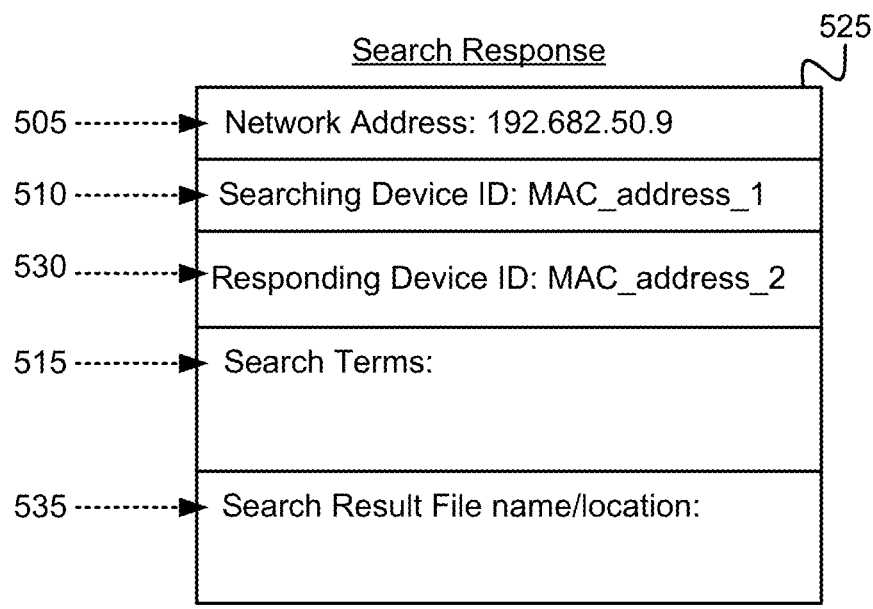
FIG. 5B illustrates an exemplary search response message for a device to return search results to a search-originating device.

FIG. 5B illustrates an exemplary search response message 525 (referred to herein as "Search Response 525") for a device 100 to return search results to a search-originating device 100 connected to router 105. Search response 525 may include a network address field 505, a searching device identifier ID field 510, a responding device ID field 530, a search terms field 515, and a search result file name/location field 535. Search response 525 may include additional fields that are not shown in FIG. 5A for purposes of simplicity.

Responding device ID field 530 stores a unique ID (e.g., a Medium Access Control (MAC) address) of the device 100 that is responding to a search request 500 from the device identified by the device ID in searching device ID field 510. Search result file name/location field 535 stores the file names and locations of the files stored within a memory of the responding device, identified in field 530, whose names and/or associated metadata match the search terms of field 515. A "file location," as referred to herein, may include a folder/subfolder path to a particular location in device memory where each search result file, that matches the search terms of field 515, is stored.

Figure 6A:
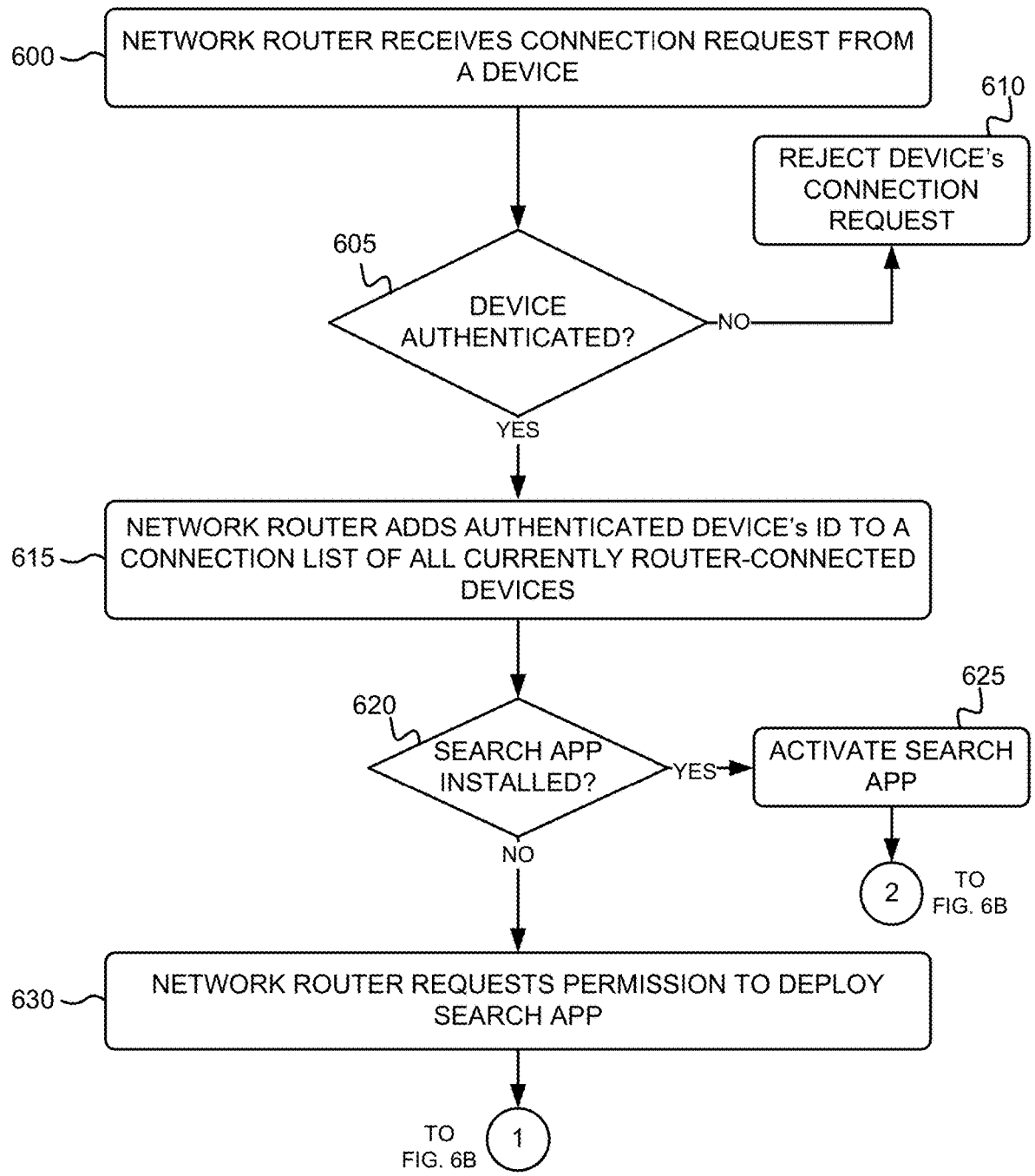
FIGS. 6A and 6B are flow diagrams that illustrate an exemplary process for connecting a device to a network router, and for deploying a search application to the connecting device for subsequent use in router-connected device file searching.
Figure 6B:
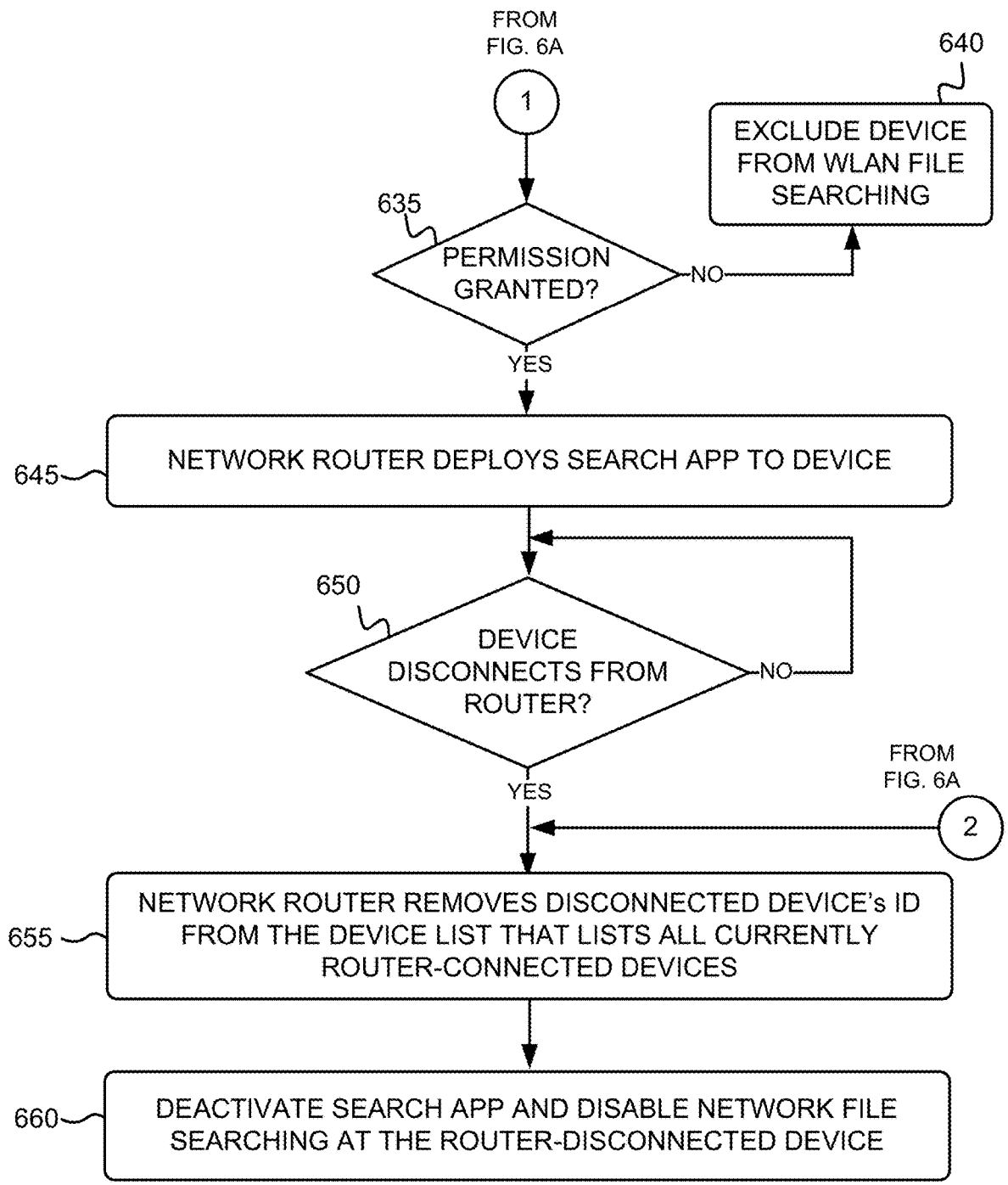

FIGS. 6A and 6B are flow diagrams that illustrate an exemplary process for connecting a device 100 to network router 105, and deploying a search application 125 to the connecting device 100 that can subsequently be used in network-connected device file searching. The exemplary process of FIGS. 6A and 6B may be implemented by network router 105 in conjunction with a router-connecting device 100. The exemplary process of FIGS. 6A and 6B is described below with reference to the messaging/operations diagram of FIG. 7.

Figure 7:
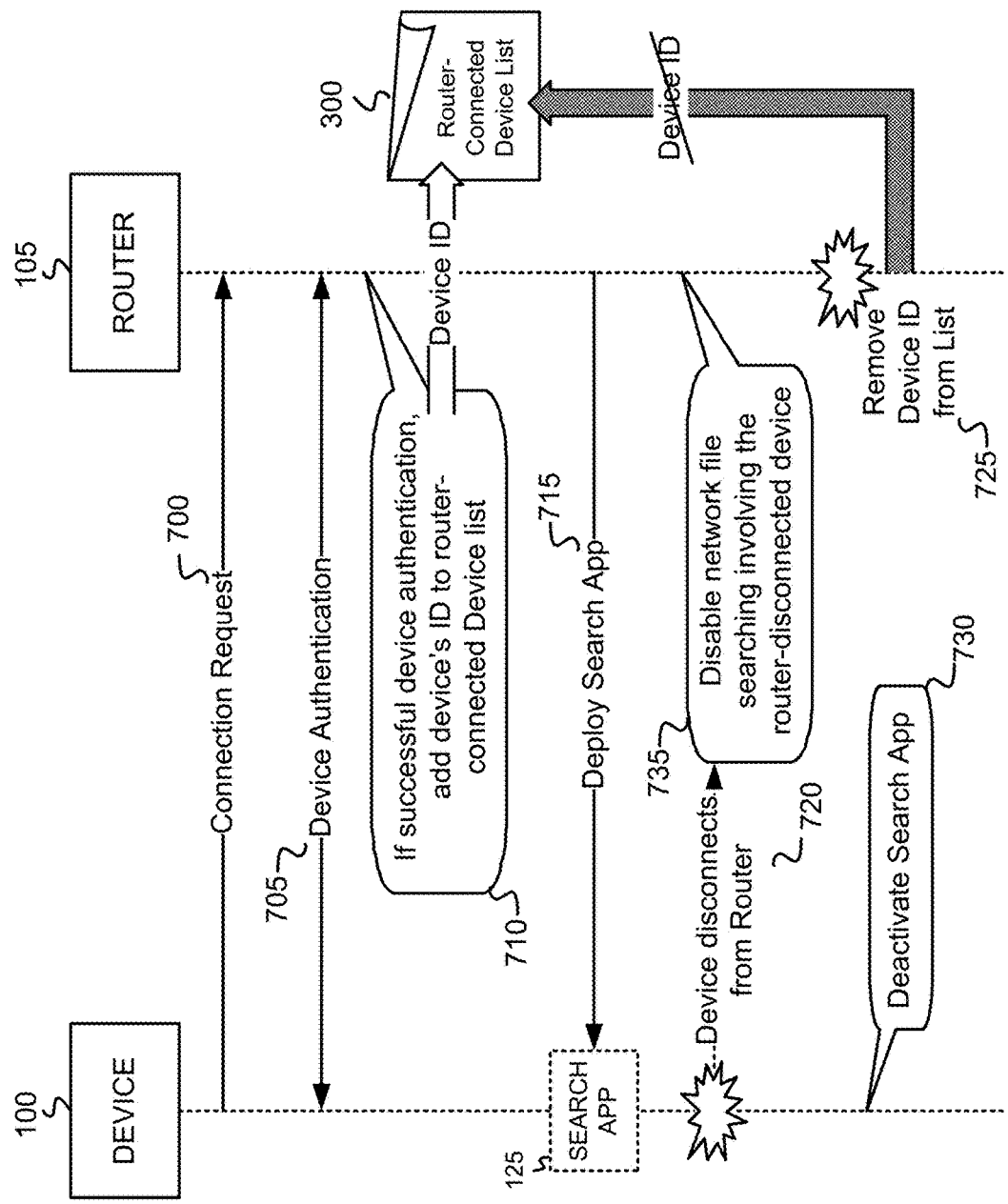
FIG. 7 is an exemplary messaging/operations diagram associated with the exemplary process of FIGS. 6A and 6B.

The exemplary process includes network router 105 receiving a connection request from a device 100 (block 600). For example, if device 100 is a wireless device, a user of device 100 may activate the device 100's wireless network (e.g., Wi-Fi) functionality, and the device 100 may send a connection request to router 105 via wireless network 205. As another example, if device 100 is a wired device, a user of device 100 may connect the device 100, using a wire, directly to a port of router 105, or to a wired network that connects to the router 105. The connection request may include, in some implementations, credentials for authenticating the device 100. The credentials may include, for example, a wireless network password. Other types of credentials, however, may be alternatively or additionally used for authenticating the device 100. FIG. 7 depicts a device 100 sending a network connection request 700 to network router 105.

Network router 105 authenticates the requesting device 100 based on the credentials (block 605). Network router 105 retrieves the credentials from the connection request and authenticates the device 100 based on the credentials. For example, network router 105 may compare the network password from the connection request with the correct network password. For example, in the case of a wireless device 100, wireless network router 105 may compare the wireless network password (e.g., WLAN password) from a wireless connection request with the correct wireless network password. FIG. 7 shows device 100 and network router 105 engaging in a device authentication process 705.

If network router 105 cannot authenticate the requesting device 100 (NO—block 605), then network router 105 rejects the device 100's connection request (block 610). Network router 105 may, for example, send an authentication failure message to the requesting device 100. If network router 105 authenticates the requesting device 100 (YES—block 605), then network router 105 adds the authenticated device 100's device ID to a connection list of all devices 100 currently connected to router 105 via wireless or wired connections (block 615). Network router 105 may store a connection list that keeps track of all devices 100 currently connected to router 105 (e.g., via wireless network 205, or via a wired connection). As devices 100 connect to router 105, they are added to the list, and as the devices 100 disconnect from the router 105, they are removed from the list. FIG. 7 illustrates network router 105, if the device authentication process 705 is successful, adding 710 the device's ID to device connection list 300.

Network router 105 determines if a search app 125 is already installed at the device 100 (block 620). For example, network router 105 may query the device 100 to determine whether the search app 125 is currently installed at the device 100. If a search app is already installed at the device 100 (YES—block 620), then network router 105 activates the search app (block 625). After installation of a search app 125 at device 100, the search app may be in a "sleeping" or de-activated state. Network router 105 may send a "wakeup" or "activation" command to the device 100 to activate the search app 125 for use in file searching.

If a search app has not already been installed at the device 100 (NO—block 620), then network router 105 requests permission to deploy a search application 125 to the device 100 (block 630). For example, network router 105 may send a deployment permission request to the device 100. A user of the device 100 may grant permission to network router 105 to deploy the search app 125, or the user's settings stored at device 100 may automatically grant permission to network router 105 to deploy the search app 125. If permission to deploy the search application to the device 100 is not granted (NO—block 635), then network router 105 excludes the device 100 from network file searching (block 640). Exclusion of the device 100 from network file searching may include removing the device 100's device ID from device list 300 (e.g., of block 615) that is used for identifying devices 100 to which search requests 500 are to be broadcast. If permission to deploy the search application to the device 100 is granted (YES—block 635), then network router 105 deploys a copy of the search app 125 to the device 100 (block 645). Network router 105 may send one or more installation files for installing an executable version of search app 125 at the device 100. FIG. 7 depicts wireless network router 105 deploying 715 a search app 125 to device 100. Deployment of search app 125 includes installation and storage of search app 125 at device 100 for subsequent use in wireless network file searching.

Network router 105 determines if the wireless device 100 subsequently disconnects from router 105 (block 650). A user of wireless device 100 may carry the device outside the wireless range of network router 105, causing the device 100 to automatically disconnect from wireless network 205. If device 100 is a wired device, a user of device 100 may manually disconnect the device 100 from router 105. Additionally, a user of wireless device 100 may manually de-activate (e.g., via the device's settings) the device 100's wireless network (e.g., Wi-Fi) functionality, causing the device 100 to disconnect from wireless network 205. When the device 100 disconnects from the router 105 (YES—block 650), then network router 105 removes the disconnected device 100's device ID from the device list 300 that lists all currently router-connected devices (block 655). FIG.

7 depicts device 100 disconnecting 720 from router 105 (not shown) and router 105 removing the device 100's device ID from device list 300.

Upon disconnection of the device 100 from the router 105, the search app 125 at the device 100 is de-activated, and wireless network file searching at the device 100 is disabled (block 660). In one implementation, the search app 125 at the device 100 recognizes the device 100's disconnection from the router 105 and deactivates itself to disable network file searching at the device 100. For example, if a user of the device 100 attempts to execute the search app 125 to perform network file searching when the device 100 is disconnected from the router 105, then search app 125 may present an error message via a display of device 100. Disabling wireless network file searching may include network router 105 verifying that the disconnected device 100 is removed from device list 300, discarding any queued search requests 500 from the device 100, and discarding any queued search responses 525 that were responding to search requests from the device 100. FIG. 7 depicts device 100 de-activating 730 search app 125, and network router 105 disabling 735 network file searching at the router-disconnected device.

Figure 8A:
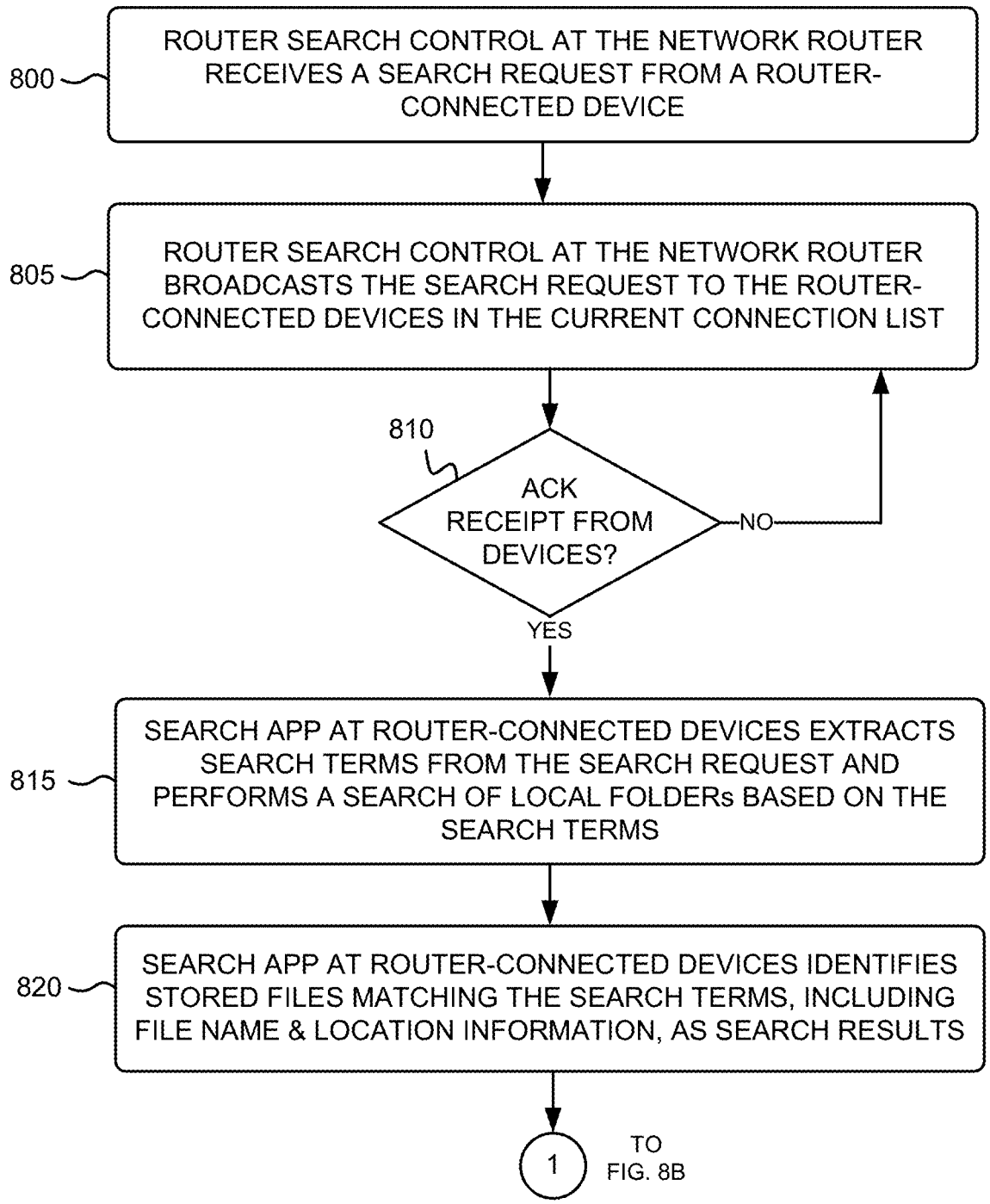
FIGS. 8A and 8B are flow diagrams of an exemplary process for coordinating file searching among multiple router-connected devices.
Figure 8B:
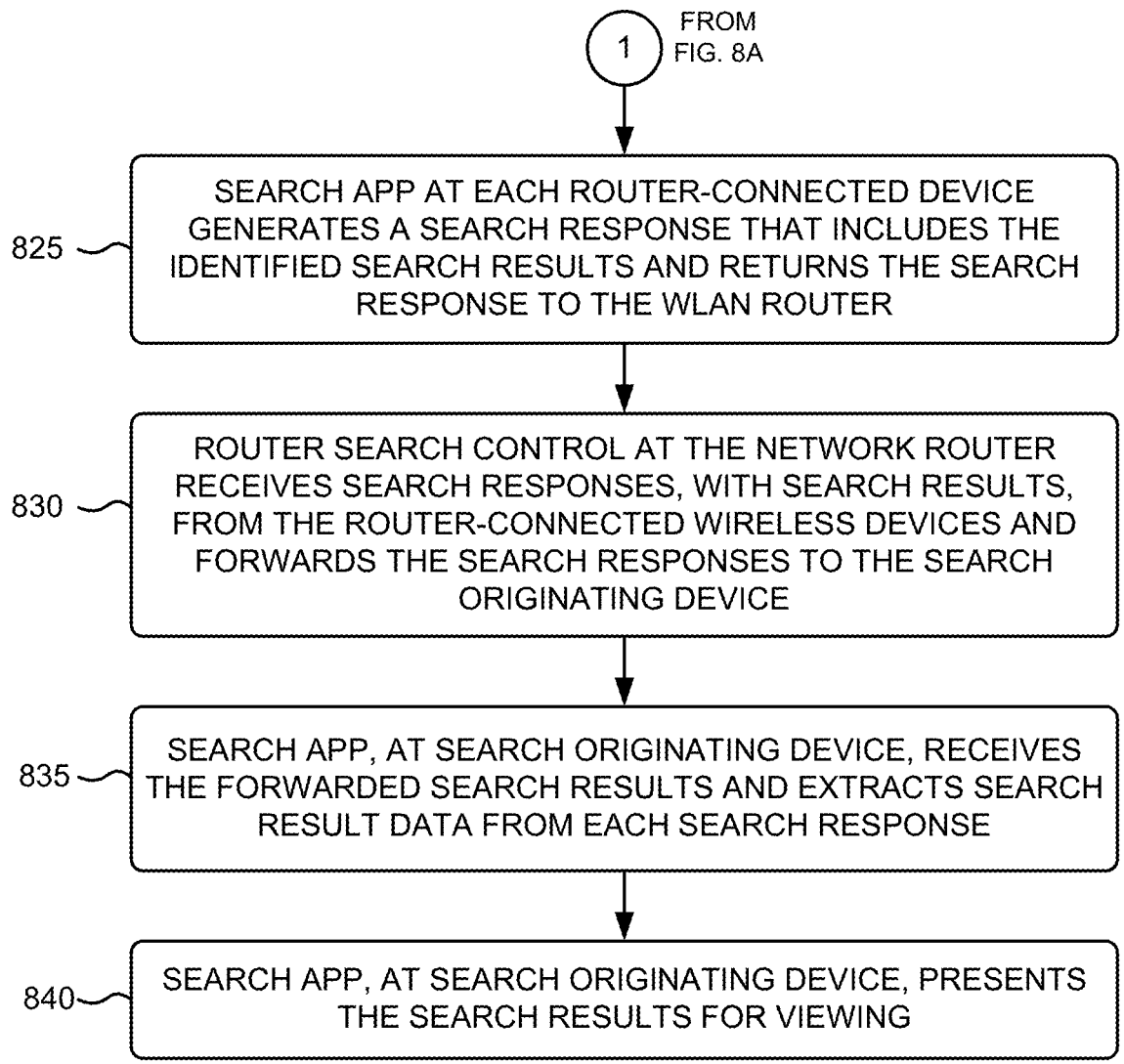

FIGS. 8A and 8B are flow diagrams of an exemplary process for coordinating file searching among multiple devices 100 connected to network router 105 (e.g., via wireless network 205 or via a wired connection). The exemplary process of FIGS. 8A and 8B may be implemented by router search control 110 of network router 105 in conjunction with wired or wireless devices 100. The exemplary process of FIGS. 8A and 8B may be executed for each search request received from a device 100 at router search control 110 of router 105.

Figure 9:
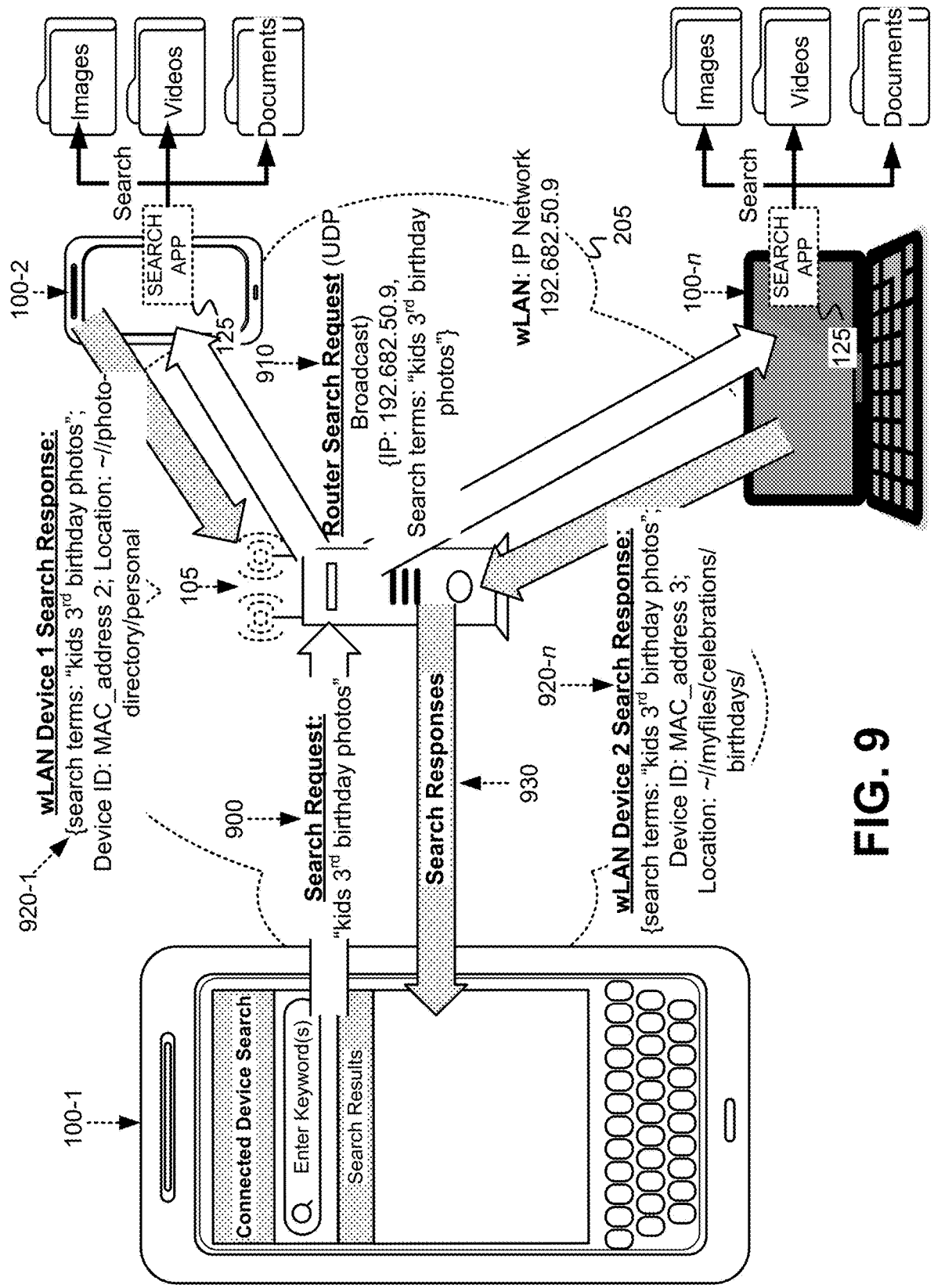
FIG. 9 illustrates an example of a network router coordinating file searching among multiple router-connected devices.

The exemplary process includes router search control 110 at network router 105 receiving a search request from a router-connected device 100 (block 800). A user at a search originating device 100 enters search terms for performing file searching at the other router-connected devices (e.g., devices 100 connected to router 105 via wireless network 205, or via a wired connection). The search originating device 100 generates a search request 500, which includes a network address associated with the router 105, a device ID of the search-originating device, and the search terms, and sends the search request 500 to network router 105. FIG. 9 depicts an example in which a search originating wireless device 100-1 sends a search request 900 to network router 105 for broadcast to wireless devices 100-2 and 100-n that are currently connected to the wireless network 205. In this example, a user (not shown) at device 100-1 has entered the keywords "kids," "3$^{rd}$ birthday" and "photos," as the search terms for the file searching. In some implementations, parental management controls of the wireless network-connected device searching may be applied by router search control 110 at wireless router 105. For example, the parental management controls may analyze the search terms contained in the search request 500, and disallow or reject searches for certain search terms. Additionally, or alternatively, the parental management controls may restrict which folders and/or subfolders may be searched at particular wireless devices.

Router search control 110 at network router 105 broadcasts the search request to the router-connected devices 100 listed in the current connection list 300 (block 805). Router search control 110 consults the router-connected device list 300 to identify the devices 100 connected to the network router 105. Router search control 110 then broadcasts the search request received from the search originating device 100 to the other devices 100 identified as being connected to the network router 105. Referring to the example of FIG. 9, upon receipt of the search request 900 from search originating device 100-1, network router 105 broadcasts the original search request 900 as a router search request 910 to devices 100 (devices 100-2 and 100-n, in this example), other than the search originating device 100-1, that are currently listed in the router-connected device list 300. The broadcasted router search request 910 includes the network address associated with the router 105 (e.g., the network address of wireless network 205), and the search terms received from search originating device 100-1.

Router search control 110 determines if an acknowledgement (ACK) receipt has been received from the devices 100 in the current connection list 300 (block 810). Each device 100 that receives the search request from the network router 105 replies with an ACK message that acknowledges receipt of the search request. Router search control 110 compares each received ACK message with the devices listed in the router-connected device list 300 to determine whether any of the router-connected devices 100 have failed to return a responsive ACK message. If an ACK has not been received from the devices 100 (NO—block 810), router search control 110 re-broadcasts the search request (block 805). If any of the router-connected devices 100 fail to return a responsive ACK message within a configurable period of time, then router search control 110 re-broadcasts the router search request 910 to the devices 100.

Upon receipt of the search request, the search app 125 at each of the receiving router-connected wireless devices 100 extracts search terms from the search request and performs a search of local folders based on the search terms (block 815). Referring to the example of FIG. 9, search app 125 at device 100-2, upon receipt of the broadcast search request 910, extracts the keywords "kids 3$^{rd}$ birthday photos" from the search terms. The search app 125 then performs a file search within the memory(ies) of device 100-2, based on the extracted search terms. For example, the search app 125 identifies all files stored within one or more memory devices of device 100-2 having file names, or metadata, that match one or more of the search terms. Other types of parameters associated with the files, such as file types (e.g., audio, video, PDF documents, etc.) may be used for matching one or more of the search terms. In the example of FIG. 9, search app 125 at wireless device 100-2 additionally performs a search of folders storing image, videos, and documents to identify files having file names or metadata that match one or more of the search terms from the search request 910. Wireless device 100-n, upon receipt of the search request 910, similarly performs a file search within the memory(ies) of device 100-n based on the extracted search terms. In some implementations, a user of a wireless device 100 may enter, into search app 125, permissible file search areas of the memory(ies) of device 100. For example, the user may exclude certain folders, subfolders, and/or files from being searched by search app 125 when a broadcast search request is received from wireless network router 105. These folders, subfolders, and/or files, thus, are hidden from any searching performed by search app 125 at the wireless device 100.

The search app 125 at each of the search request receiving router-connected devices 100 identifies stored files whose data match the extracted search terms, including a file name and file location information, as search results (block 820). For each file stored at the search request receiving device 100, search app 125 identifies the file's name or label, and determines a location of the file (e.g., a file path) within the memory of the searching device 100. Referring to the example of FIG. 9, a search based on the keywords "kids $3^{rd}$ birthday photos" may identify a file with file name "Susan's $3^{rd}$ birthday party" and is located at "~//photo-directory/personal" within the memory of device 100-2. Additionally, a search based on the keywords "kids $3^{rd}$ birthday photos" may identify a file with a file name "Jack's $3^{rd}$ birthday" and is located at "~//myfiles/celebrations/birthdays" within the memory of device 100-n.

The search app 125 at each of the search request receiving router-connected devices 100 generates a search response that includes the search results and returns the search response to the network router 105 (block 825). Referring to the example of FIG. 9, device 100-2, after performing a search based on the search terms, generates a search response 920-1 that includes the original search terms, the ID of device 100-2, and the file name and file location information of matching files identified by search app 125 at device 100-2. Additionally, device 100-n, after performing a search based on the search terms, generates a search response 920-n that includes the original search terms, the ID of device 100-n, and the file name and file location information of the matching files identified by search app 125 at device 100-n. Device 100-2 returns search response 920-1 to the wireless network router 105, and device 100-n returns search response 920-n to the wireless network router 105.

Router search control 110 at the network router 105 receives the search responses, with the search results, from the router-connected devices 100 and forwards the search responses to the search originating device 100 (block 830). FIG. 9 depicts wireless network router 105 forwarding the search responses 930 to search-originating device 100-1. The search responses 930 include search response 920-1 and 920-n that may be appended to one another as a single search response message. A search app 125, at the search-originating wireless network-connected wireless device 100, receives the forwarded search results from wireless network router 105, and extracts the search result data from each search response (block 835). Referring to the example of FIG. 9, search app 125 at device 100-1 extracts the search terms, device ID, file names, and file location information from search responses 920-1 and 920-n.

Figure 10:
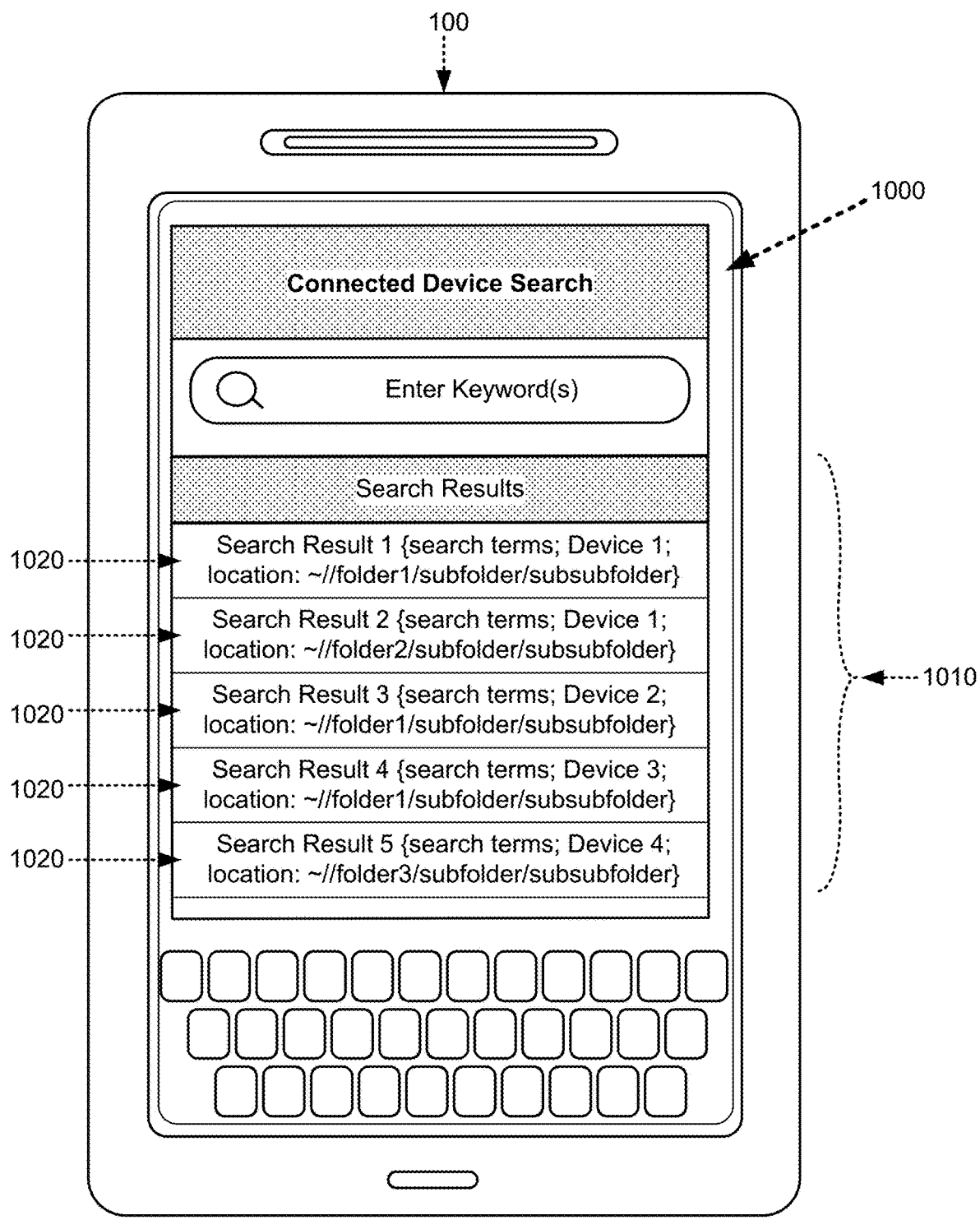
FIG. 10 illustrates an example of a display of a device that is used to present search results.

The search app 125, at the search-originating router-connected device 100, presents the search results for viewing (block 840). FIG. 10 illustrates a display 1000 of a wireless device 100 that is used to present search results 1010 to a user of the device 100. As shown, each individual search result 1020 may include a summary of the search result, such as the search terms, an ID of the searched device, and a file name and location of a file stored at the searched device that matches the search terms. The display 1000 of device 100 shown in FIG. 10 may, for example, be a touch screen display that enables user selection of individual search results 1020 for bookmarking, copying, emailing, texting, and/or downloading. The search-originating wireless device 100 may additionally store the search results in memory for future retrieval and presentation to the user of device 100.

Figure 11:
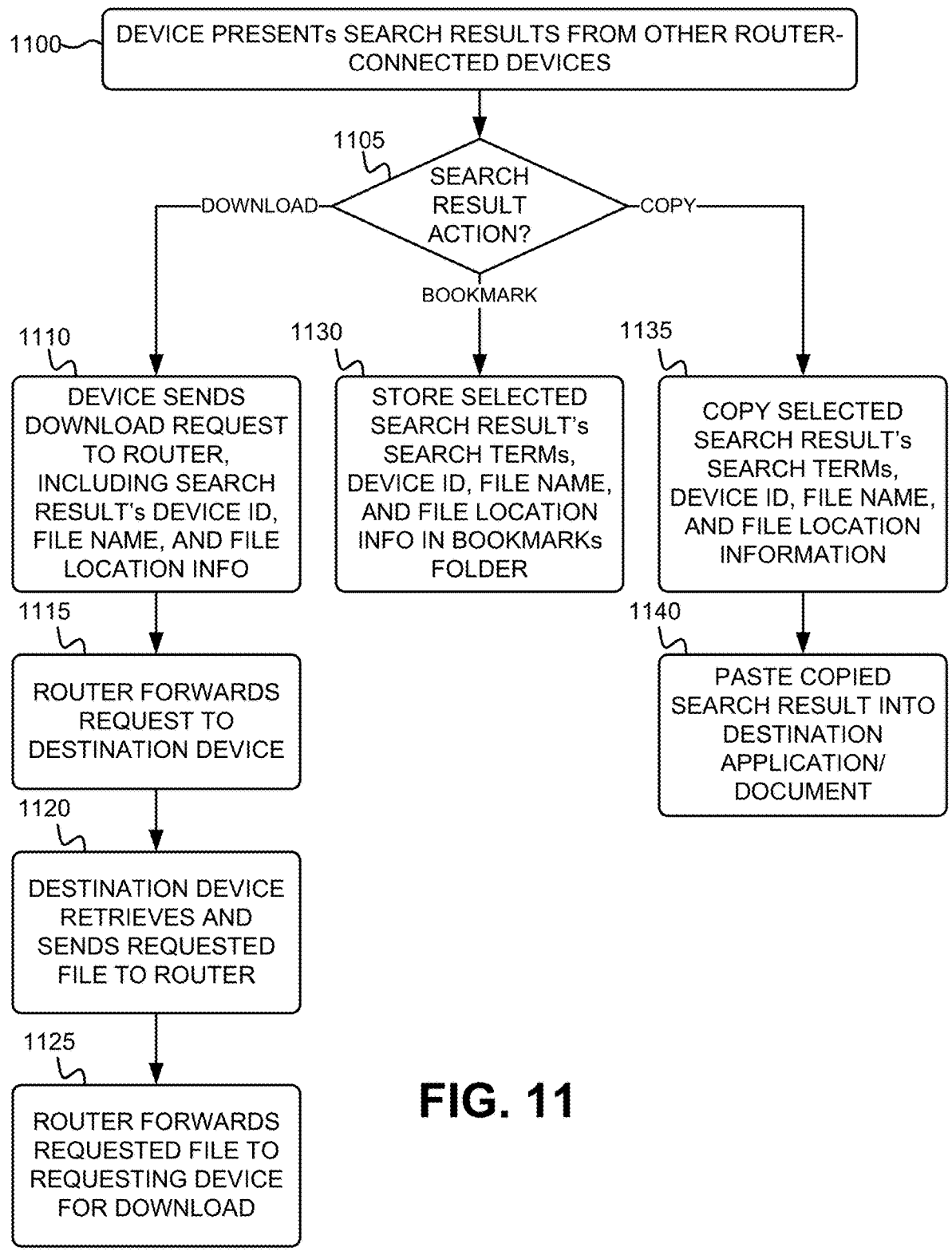
FIG. 11 is a flow diagram of an exemplary process associated with the presentation of search results, received from router-connected devices, at a search-originating device.

FIG. 11 is a flow diagram of an exemplary process associated with the presentation of search results, received from router-connected devices 100, at a search-originating device 100. The exemplary process of FIG. 11 may be implemented by a device 100, possibly in conjunction with network router 105 and another device 100 that stores a particular file associated with the search results.

The exemplary process includes device 100 presenting search results from other router-connected devices 100 (block 1100). Block 1100 may correspond to block 840 of FIG. 8B, when search app 125 at a search-originating device 100 presents recently returned search results from another router-connected device 100. Alternatively, the search results presented in block 1100, may be previously returned search results that the search app 125 stored for future retrieval, and which a user of the device 100 retrieves from memory for viewing. Device 100 may present the search results via, for example, a touch screen display of device 100.

Figure 12:
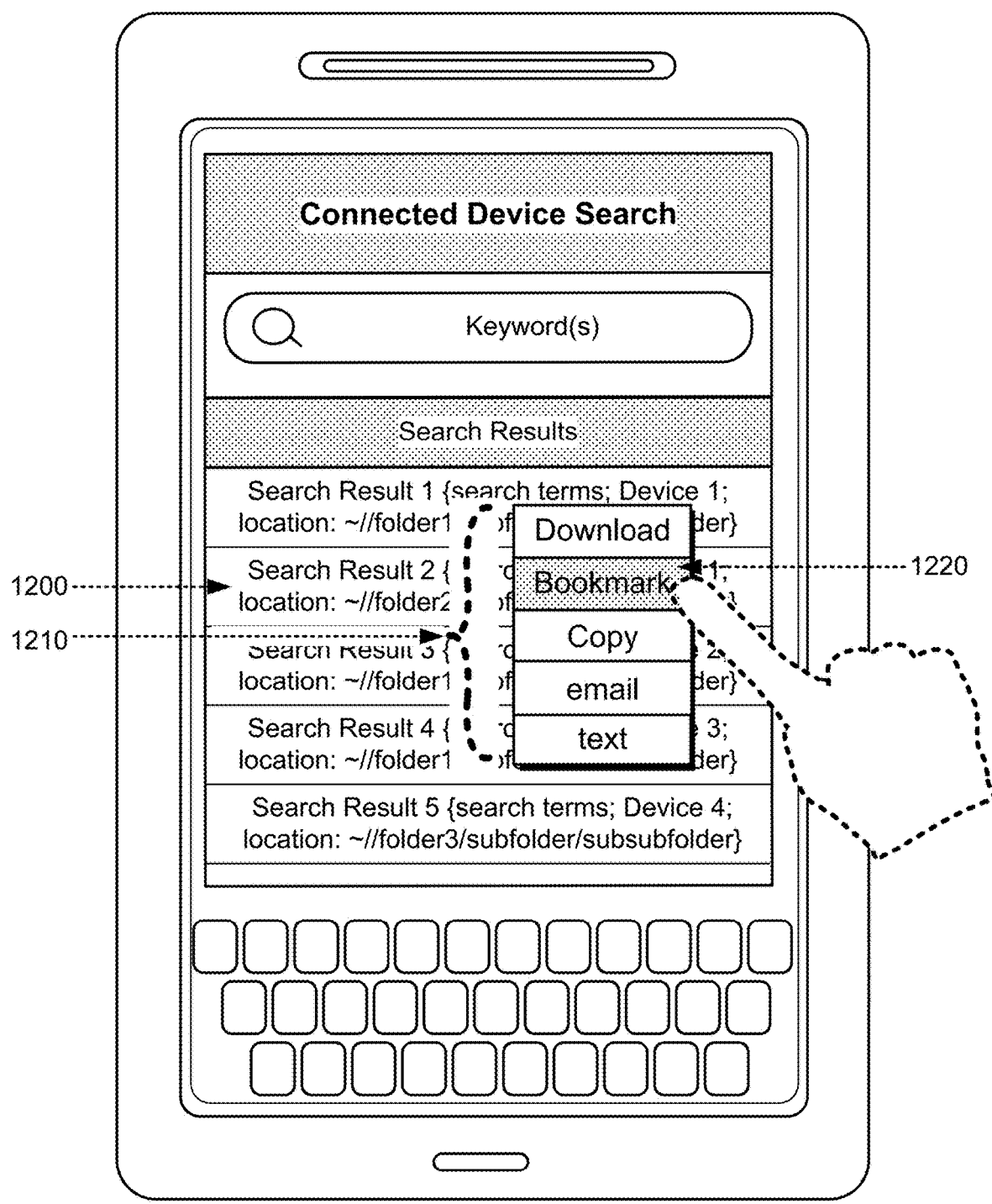
FIG. 12 illustrates an example of a user selecting, using a touch screen display of a device, a particular search result and the user selecting a particular action, from a list of actions, to perform upon the selected search result.

Device 100 determines if a search result has been selected for a particular action (block 1105). The actions may include, for example, bookmarking a search result, copying a search result, emailing a search result, texting a search result, viewing a search result, or downloading a file associated with the search result. As shown in FIG. 12, a user of device 100 may manually select a particular search result 1200 and may then select an action from a list of actions 1210 to perform for the selected search result 1200. For example, as shown, the user may select the "bookmark" action to cause the selected search result to be stored in a "bookmark" folder that includes significant or important search results. The user of device 100 may further select a "download" action from the list of actions 1210 to cause the file associated with the search result to be downloaded from the wireless network-connected device 100 at which the file is currently locally stored. The user of device 100 may also select a "copy" action from the list of actions to copy the content of the search result for, for example, pasting in another application or document. The user of device 100 may further select an "email" action from the list of actions 1210 to cause the search result to be automatically inserted into a default email application at device 100 for emailing the search result to a particular individual. The user of device 100 may additionally select a "text" action from the list of actions 1210 to cause the search result to be automatically inserted into a text application input field at device 100 for texting the search result to a particular individual.

If the action selected at the device 100, for a particular search result, is a "download" action (DOWNLOAD—block 1105), then device 100 sends a download request to network router 105, including the selected search result's device ID, the file name, and file location information (block 1110). Upon receipt of the download request, network router 105 forwards the request to the destination device 100 that corresponds to the search result's device ID (block 1115). Wireless network router 105 extracts the device ID from the download request, and forwards the request on to the device 100 which has that particular device ID (e.g., MAC address). The destination device 100 extracts the file name and file location information from the download request, retrieves the requested file from memory at a path identified by the file location information, and sends the file to wireless network router 105 (block 1120). Wireless network router 105 forwards the requested file to the requesting device 100 for download (block 1125). Network router 105 may, for example, create a TCP/IP socket(s) for relaying the file from destination device 100 to the file requesting device 100. The requesting device 100 then stores the downloaded file in memory.

If the action selected at the device 100, for a particular search result, is a "bookmark" action (BOOKMARK—block 1105), then device 100 stores the selected search result's search terms, device ID, file name, and file location information in a local bookmarks folder at device 100 (block 1130). The user of device 100 may subsequently easily retrieve the stored search result by viewing the bookmarked search results.

If the action selected at the device 100, for a particular search result, is a "copy" action (COPY—block 1105), then device 100 copies the selected search result's search terms, device ID, file name, and file location information into a temporary notepad for subsequent pasting into another application or document (block 1135). Device 100 pastes the copied search result into a destination application or document (block 1140). The user of device 100, for example, may copy a search result and paste the search result into a text or email, a word processing document, or into a different application. Though not shown as a possible "action" in block 1105, the user at device 100 may alternatively select an "email" or "text" action which, when selected, automatically copies the search result and pastes the content of the search result into a new email of a default email application or into a new text input field of a texting application.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A, 6B, 8A, 8B, and 11 and operation/message flows with respect to FIG. 7, the order of the blocks and/or operation/message flows may be varied in other implementations. Moreover, non-dependent blocks may be performed in parallel. Implementations have been described herein as enabling file searching among wireless devices 100 connected to a wireless network established by a wireless network router 105. However, in other implementations, the file searching described herein may be enabled in a wired network environment, with a wired network router 105, where the devices 100 include wired devices. In such implementations, the network may include, for example, a wired local area network (LAN), or other type of wired network. In such wired implementations, referring to FIG. 2, devices 100-1 through 100-n may include wired devices that connect to router 105 via wired connections, and router 105 serves as a wired routing device for interconnecting devices 100 with external network 210 in addition to serving as a host for router search control 110. Similar to that described above, router search control 110, in wired implementations, acts as a facilitator for processing, storing, and forwarding search requests and search results between wireless and/or wired network-connected devices 100.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    generating, by a network router, a list of devices that are connected to the network router, wherein the list identifies a first device and at least a second device and a third device, wherein the second device and the third device store files;
    determining, by the network router, that an executable file searching application is not installed on the second device or the third device;
    sending, by the network router, a permission request to the second device and the third device to provision an executable file searching application;
    receiving, by the network router and from the second device, permission to provision the executable file searching application;
    provisioning, by the network router and based on the permission, the executable file searching application on the second device;
    receiving, at the network router from the first device, a first search request that includes search terms for performing a first file search;
    broadcasting, from the network router to the second device in the list of devices, the search terms;
    receiving, at the network router, one or more search responses from the executable file searching application on the second device, wherein each of the one or more search responses comprises a device identifier (ID) associated with the second device, and a file name and file location information of at least one file of the stored files that corresponds to the search terms; and
    forwarding, from the network router, the one or more search responses to the first device.

2. The method of claim 1, wherein each of the first device and the second device and third device comprises one of a laptop, palmtop, desktop, or tablet computer; a cellular phone; a Voice over Internet Protocol (VoIP) phone; a smart television (TV); or a set-top box (STB) having network communication capability.

3. The method of claim 1, wherein generating the list of devices further comprises:
receiving connection requests from the first device and the second device and the third device;
authenticating the first device and the second device and the third device; and
adding the first device and the second device and the third device to the list of devices upon the authentication.

4. The method of claim 1, further comprising:
determining that the first device has disconnected from the network router following receipt of a second search request from the first device to perform a second file search; and
removing the first device from the list of devices and discarding the second search request from a queue when the first device is disconnected from the network router.

5. The method of claim 1, wherein the first device connects to the network router via a wireless local area network (WLAN), and wherein the network router comprises a WLAN router.

6. The method of claim 1, further comprising:
receiving, from the first device before the generating, a connection request for connecting to the network router;
determining, responsive to the connection request, that the executable file searching application is to be installed at the first device; and
deploying, from the network router, the executable file searching application to the first device for installation before receiving the first search request.

7. The method of claim 1, further comprising:
determining that the second device has disconnected from the network router after sending another search response associated with the first file search;
deactivating the executable file searching application to disable file searching of the second device; and
discarding the other search response from a queue.

8. The method of claim 1, wherein the second device comprises a plurality of other devices,
wherein broadcasting the search terms comprises:
broadcasting, from the network router, the first search request to the plurality of other devices,
wherein receiving the first search responses comprises:
receiving, at the network router, search responses from the plurality of other devices, and
wherein forwarding, from the network router, the search responses comprises:
forwarding, from the network router, the search responses from the plurality of other devices to the first device.

9. A router device, comprising:
at least one communication interface; and
one or more processors, or logic, configured to:
generate a list of devices that are connected to the router device, wherein the list identifies a first device and at least a second device and a third device, wherein the second device and the third device store files;
determine that an executable file searching application is not installed on the second device or the third device;
send a permission request to the second device and the third device to provision an executable file searching application;
receive, from the second device, permission to provision the executable file searching application;
provision, based on the permission, the executable file searching application on the second device;
receive, via the at least one communication interface from the first device, a first search request that includes search terms for performing a first file search;
broadcast, via the at least one communication interface to the second device in the list of devices, the search terms;
receive, via the at least one communication interface, one or more search responses from the executable file searching application on the second device, wherein each of the one or more search responses comprises a device identifier (ID) associated with the second device, and a file name and file location information of at least one file of the stored files that corresponds to the search terms; and
forward, via the at least one communication interface, the one or more search responses to the first device.

10. The router device of claim 9, wherein each of the first device and the second device and the third device comprises one of a laptop, palmtop, desktop, or tablet computer; a cellular phone; a Voice over Internet Protocol (VoIP) phone; a smart television (TV); or a set-top box (STB) having network communication capability.

11. The router device of claim 9, wherein, to generate the list of devices, the one or more processors, or logic, are further configured to:
receive connection requests from the first device and the second device and the third device;
authenticate the first device and the second device and the third device; and
add the first device and the second device and the third device to the list of devices upon the authentication.

12. The router device of claim 9, wherein the one or more processors, or logic, are further configured to:
determine that the first device has disconnected from the router device following receipt of a second search request from the first device to perform a second file search; and
remove the first device from the list of devices and discard the second search request from a queue when the first device is disconnected from the router device.

13. The router device of claim 9, wherein the first device connects to the router device via a wireless local area network (WLAN), and wherein the router device comprises a WLAN router.

14. The router device of claim 9, wherein the one or more processors, or logic, are further configured to:
receive, from the first device and before the generation, a connection request for connecting to the router device;
determine, responsive to the connection request, that the executable file searching application is to be installed at the first device; and
deploy, from the router device, the executable file searching application to the first device for installation before receiving the first search request.

15. The router device of claim 9, wherein the one or more processors, or logic, are further configured to:
determine that the second device has disconnected from the router device after sending another search response associated with the first file search;
deactivate the executable file searching application to disable file searching of the second device; and
discard the other search response from a queue.

16. The router device of claim 9, wherein the second device comprises a plurality of other devices, wherein, when broadcasting the search request, the one or more processors or logic is configured to:
   broadcast, from the router device, the first search request to the plurality of other devices,
wherein, when receiving the first search responses, the one or more processors or logic is configured to:
   receive, at the router device, search responses from the plurality of other devices, and
wherein, when forwarding the search responses, the one or more processors or logic is configured to:
   forward, from the router device to the first device, the search responses from the plurality of other devices.

17. A non-transitory storage medium storing instructions executable by a router device, wherein the instructions comprise instructions to cause the router device to:
   generate a list of devices that are connected to the router device, wherein the list identifies a first device and at least a second device and a third device, wherein the second device and the third device store files;
   determine that an executable file searching application is not installed on the second device or the third device;
   send a permission request to the second device and the third device to provision an executable file searching application;
   receive, from the second device, permission to provision the executable file searching application;
   provision, based on the permission, the executable file searching application on the second device;
   receive, from the first device, a first search request that includes search terms for performing a first file search;
   broadcast, from the router device to the second device in the list of devices, the search terms;
   receive, at the router device, one or more search responses from the executable file searching application on the second device, wherein each of the one or more search responses comprises a device identifier (ID) associated with the second device, and a file name and file location information of at least one file of the stored files that corresponds to the search terms; and
   forward, from the router device, the one or more search responses to the first device.

18. The non-transitory storage medium of claim 17, wherein the instructions further comprise instructions to cause the router device to:
   receive connection requests from the first device and the second device and the third device;
   authenticate the first device and the second device and the third device;
   add the first device and the second device and the third device to the list of devices upon the authentication;
   determine if the first device has disconnected from the router device; and
   remove the first device from the list of devices if the first device has disconnected from the router device.

19. The non-transitory storage medium of claim 17, wherein the first device connects to the router device via a wireless local area network (WLAN), and wherein the router device comprises a WLAN router.

20. The non-transitory storage medium of claim 17, wherein the instructions further comprise instructions to cause the router device to:
   receive, from the first device and before the generation, a connection request for connecting to the router device;
   determine, responsive to the connection request, that the executable file searching application is to be installed at the first device;
   deploy, from the router device, the executable file searching application to the first device for installation before receiving the first search request;
   determine if the second device has disconnected from the router device after sending another search response associated with the first file search;
   deactivate the executable file searching application to disable file searching of the second device; and
   discard the other search response from a queue.

* * * * *